June 19, 1928.  
J. H. DENNEDY  
1,674,162  
ARTIFICIAL REFRIGERATING APPARATUS  
Filed Aug. 18, 1921  
3 Sheets-Sheet 1

INVENTOR.  
James H. Dennedy  
BY  
Charles E. Vrius  
ATTORNEY.

June 19, 1928.  
J. H. DENNEDY  
1,674,162  
ARTIFICIAL REFRIGERATING APPARATUS  
Filed Aug. 18, 1921   3 Sheets-Sheet 3

INVENTOR.  
James H. Dennedy.  
BY  
Charles E. Weiser  
ATTORNEY.

Patented June 19, 1928.

1,674,162

UNITED STATES PATENT OFFICE.

JAMES H. DENNEDY, OF DETROIT, MICHIGAN, ASSIGNOR, BY MESNE ASSIGNMENTS, TO SERVEL, INC., OF NEW YORK, N. Y., A CORPORATION OF DELAWARE.

ARTIFICIAL REFRIGERATING APPARATUS.

Application filed August 18, 1921. Serial No. 493,266.

This invention relates to artificial refrigerating systems, and an object of the invention is to provide a compact and efficiently operating apparatus by means of which a storage compartment may be kept at the desired temperature. The system includes a compressor for taking a refrigerant from the low pressure line and compressing the same and transferring it to the high pressure line, and the principal feature of construction of this invention is in the provision of a brine circulating system including a series of coils located in a chamber forming part of the expansion system or low pressure side of the apparatus. The brine is cooled in this expansion chamber and circulated through a conduit leading to and from the chamber or insulated room to be cooled. In previous systems the expansion coils of the system have often been placed in a brine tank to reduce the temperature of the brine therein, which tank is located in the chamber or room to be cooled. With my system the brine is circulated through a coil in a closed circuit to and from the chamber or room to be cooled and this brine coil is placed in the refrigerant in a chamber under the pressure of the expansion side of the system. By this arrangement I secure not only a more effective cooling of the brine but am able to provide a system for use for instance in apartment houses where there are a series of refrigerators to be cooled in which case the refrigerating apparatus may be placed at any convenient point and the brine cooled in the apparatus and transferred through the entire series of compartments or chambers to be cooled and returned to the apparatus where the heat absorbed by the brine is taken up by the refrigerant. Other features of the invention reside in the construction of the expansion chamber containing the brine coils and mechanism for transferring the refrigerant from the high pressure line to this chamber, and in means actuated by variation in pressure of the expansion side of the system for starting and stopping operation thereof. These and other objects and various novel features of my invention are hereinafter more fully described and claimed, and the preferred form of apparatus embodying my invention is shown in the accompanying drawings in which—

Figure 1:
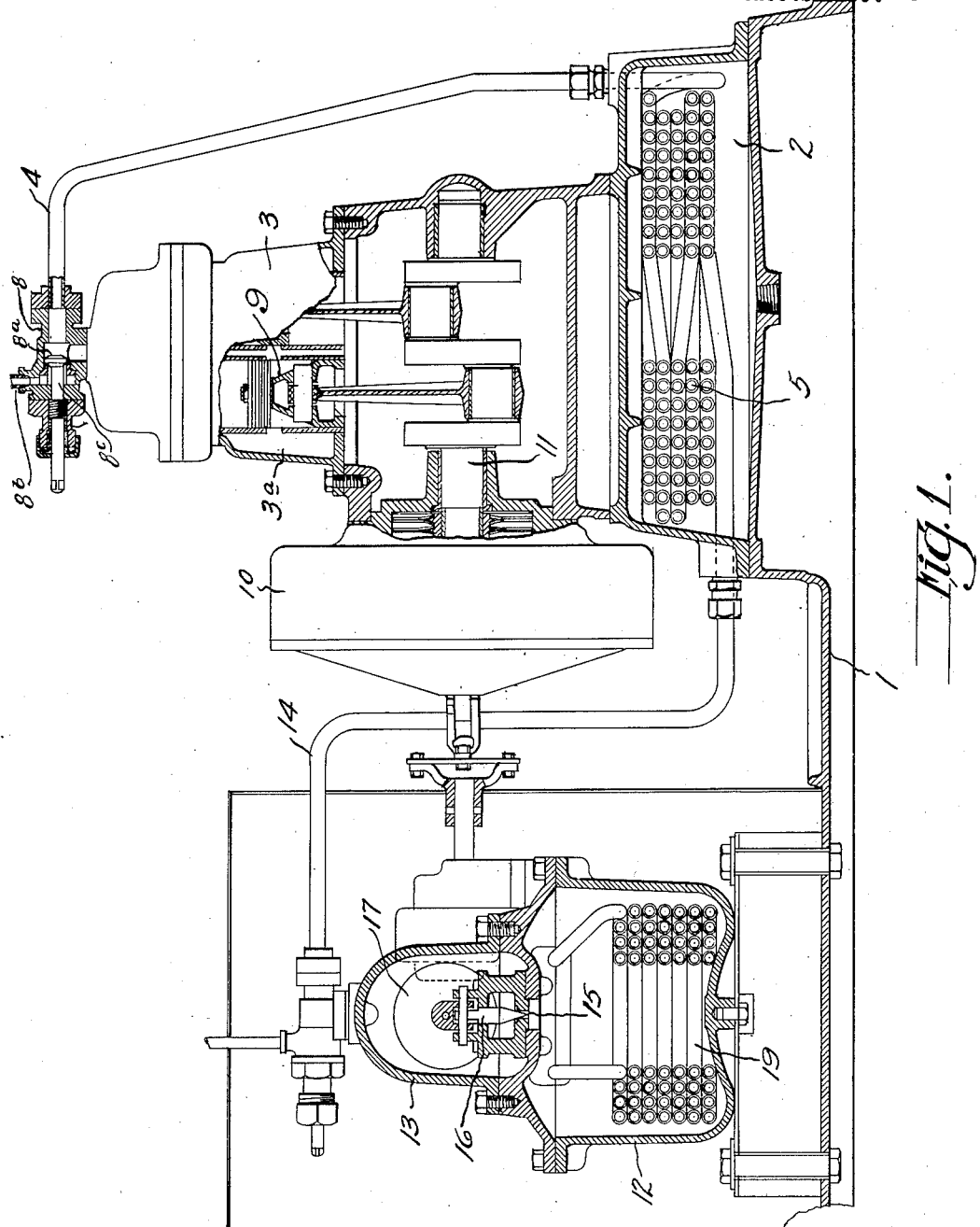
Fig. 1 is a vertical section partly in elevation of my improved artificial refrigerating apparatus.
Figure 2:
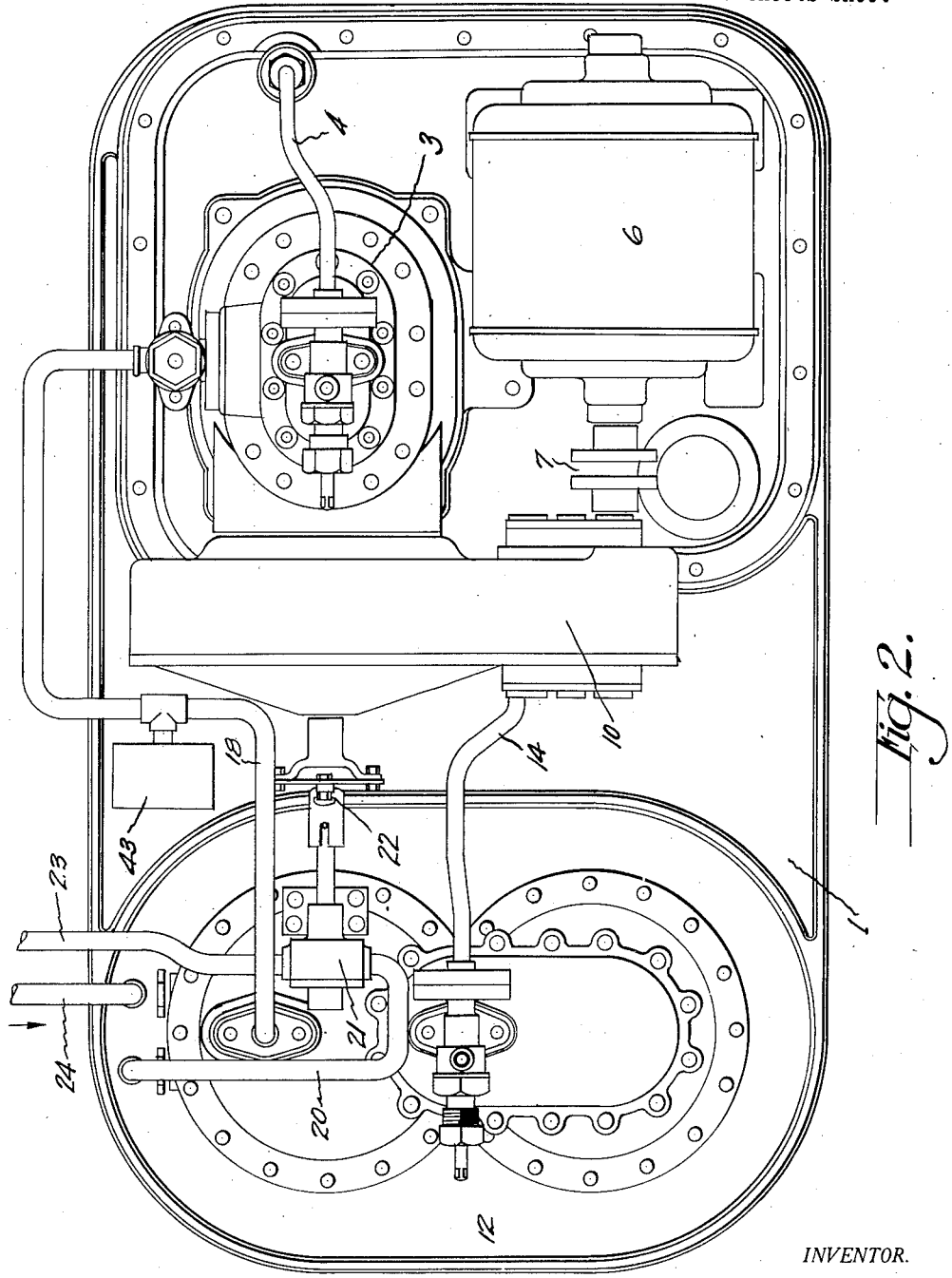
Fig. 2 is a plan view thereof.

I prefer to arrange the device in compact form as shown in the accompanying drawings and for the purpose I provide a base 1 having at one end a hollow chamber 2 above which is mounted a compressor 3 which may be of any approved type, here shown as being of the two cylinder type having an intake chamber $3^a$ into which the fluid is transferred from the low pressure side of the system. A discharge line 4 leads from the discharge end of the compressor through a discharge line 4 to the coils 5 in the cooling chamber 2 forming a part of the high pressure side of the system. The discharge line 4 leads from a valve housing 8, which is formed in the top of the compressor 13. The valve $8^a$ normally closes a passageway from a filling pipe $8^b$ into the high pressure side of the system. The shank $8^c$ of the valve $8^a$ is threaded in the valve housing 8 so that by applying a wrench to the squared outer end of the stem, the valve head may be moved off its seat and, if desired, may be removed far enough to seat against the opening to the discharge line 4, so that refrigerant from a suitable supply may be admitted through the pipe $8^b$ to replenish the supply without lowering the pressure in the condenser coils. The pump or compressor is operated by means of a motor mounted on the same base having a shaft coupled by means of a coupling 7 to a gear train in the case 10. The gears are not being here shown but are to be understood as being connected with the crank shaft 11 of the compressor.

Figure 3:
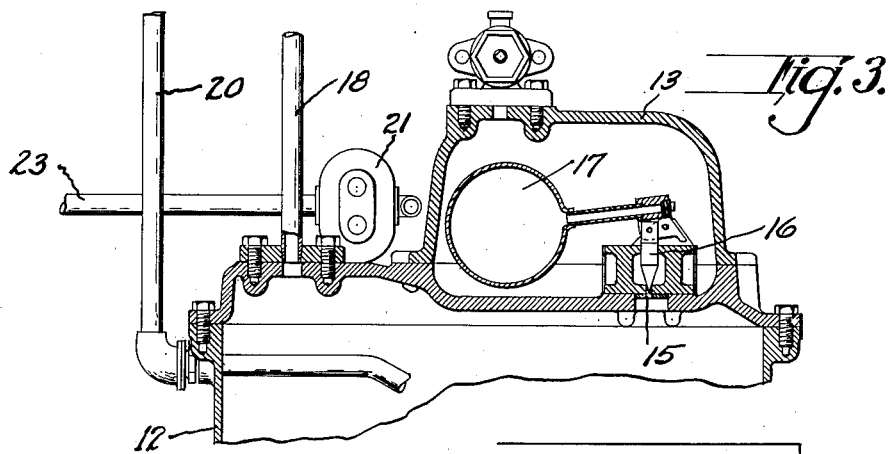
Fig. 3 is a detail in section showing the valve between the high and low pressure side of the system.

On this same base and at one side of the compressor I mount what I have termed the expansion or evaporating chamber 12 above which is a chamber 13 connected with the coils 5 by means of a conduit 14. This chamber 13 and conduit 14, coils 5 and line 4 provide the high pressure side of the system. The fluid compressed and discharged into the line 4 is heated by such compression and this heat plus the heat absorbed in the evaporating chamber is removed in the chamber 2 where the coils are immersed preferably in water circulated through the chamber 2 in any approved way as will be readily understood. This condensed refrigerant discharges into the chamber 13, which has a discharge outlet controlled by the needle valve 16, which is operated by a float 17 therein. The volume of liquid in the chamber 13 controls the opening and closing of the valve and a detail of this valve is shown in Fig. 3 from which it will be understood that, as the liquid rises above a certain level, the valve is opened permitting discharge of fluid into the evaporating chamber 12 therebelow and as the fluid in the chamber falls below a certain level the valve is closed. By this arrangement I am able to maintain a practically constant volume of refrigerant in the chamber 12.

The low pressure side of the system includes the chamber 12 and the conduit 18 leading to the intake chamber 3ª of the compressor. There is therefore a closed circulating system for the refrigerant which may be methyl chloride, sulphur dioxide or other well known refrigerant.

The brine circulating system consists of a coil of thin walled tubing 19 located in the evaporating chamber 12. This brine may be a salt brine or alcohol or other brine of the desired character and the brine coil is connected by means of a pipe 20 with the circulating pump 21 which is connected by means of a coupling member 22 with a shaft actuated by the gear train heretofore mentioned or an elongation of the shaft 11 of the compressor as will be understood from Fig. 1. From this pump 21 the brine is transferred through the pipe 23 to the compartment to be cooled and returned by means of the pipe 24 to the coil 19. This chamber 12 is practically oval in form as will be understood from Fig. 1 and coils 19 may be arranged therein in any approved manner and these coils are practically immersed in the refrigerant in the evaporating chamber 12 where the brine is cooled. Preferably the tubes or pipes 20, 23 and 24 are insulated wherever exposed to atmosphere as is sometimes the case in transferring the fluid to some little distance from the apparatus. This is likewise true particularly with the line 18 of the low pressure side of the system.

Figure 4:
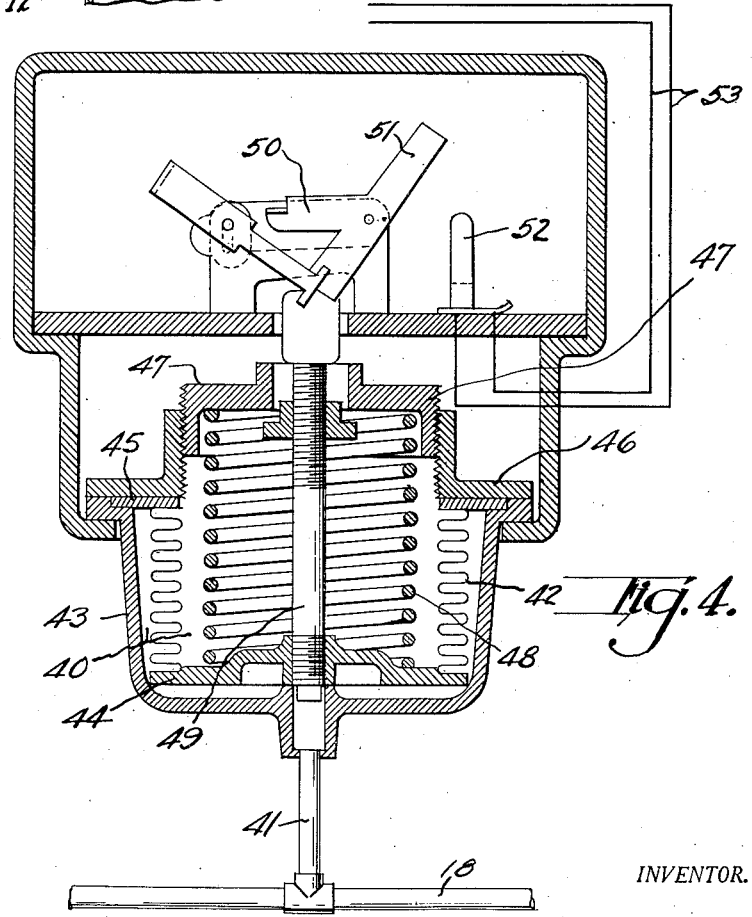
Fig. 4 is a detail of a pressure actuated switch for controlling operation of the motor.

It is usual in artificial refrigerating systems to use a thermostatically controlled switch to start and stop operation of the apparatus by variation in temperature of the compartment being cooled and (although not here shown) this type of switch may be used and in some cases may preferably be used in the controlling of this apparatus. In many installations, however, with this type of apparatus I may use a pressure controlled switch through the operation of which, as is hereinafter described, I am able to hold the brine at a practically constant temperature. This pressure controlled switch is indicated in Fig. 4 and consists of a casing 40 connected by means of a pipe 41 with the low pressure line 18 of the system. Within this chamber is a circularly corrugated expansible member 42 and the chamber 40 is formed between the exterior of this member 42 and the outer casing 43. This cylinder 42 is closed at the bottom by a plate 44 and the upper end is connected to a member 45 so that the chamber 40 is sealed with the exception of the opening of the pipe 41. The member 45 is held between the casing 43 and the cap 46 which has a central aperture, practically equal in diameter to the interior diameter of the member 42, which is threaded to receive the adjusting member 47. Between this adjusting member and the plate 44 is a coiled spring 48 tending to hold the member 42 in expanded condition. Connected to this bottom plate is a stem 49 extending upward through the central aperture in the adjusting member 47 to a switch mechanism 50 having a blade 51 which may be operated by longitudinal movement of the plunger to make and break contact with the contact members 52 of the current supply lines 53 for the motor. On an excess of pressure in the line 18 the spring is compressed and the plunger moved upward to close the switch which starts the motor to operate, and operation of the pump or compressor withdraws the fluid from and reduces the pressure in the line 18 which causes the contact to be broken by expansion of the spring 48. Thus on a certain reduction of pressure in the expansion line the apparatus is stopped and on an increase of pressure in the expansion line the apparatus is started in operation. The adjustments provided for enable the switch control device to operate at the desired high and low pressure and thus predetermine the temperature of the body being cooled which, in this case, is the brine. By varying the tension of the spring 48, and by use of the other adjustments, the system may be made to operate with a pressure controlled switch to quite closely control the temperature of the compartment being cooled by the brine system.

The operation of the system will be understood from the following description: Let it be assumed that it is desired to maintain the brine system at a temperature ranging from twenty-five to thirty degrees F., and let it be assumed that sulphur dioxide is used as a refrigerant. The principle of operation, however, would apply to any refrigerant but the numerical equation would depend upon the particular refrigerant used. The amount of heat passed through any conductor in a unit of time may be expressed by the equation $Q = A \times (T' - T'') \times C$ in which Q equals the quantity of heat transmitted in a unit of time and therefore is the rate of flow of heat through the conductor. A equals the effective area of the conductor through which the heat will pass. T' equals the temperature of the source of heat—that is, in this instance the temperature of the brine body to be cooled. T'' equals the temperature of the medium which absorbs or takes up heat from the warmer bodies and in this case is the temperature of the boiling refrigerant. C equals the coefficient which becomes a constant for similar conditions.

In any refrigerating system with the compressor running at a constant speed, Q is practically a constant quantity when variation in the evaporating pressure is not great. A is also a constant when a float valve is introduced as shown herein to control the flow of condensed refrigerant from the chamber 13 into the evaporating chamber 12. C is constant for any type of system when conditions are similar and therefore the quantity $T' - T''$ must also be a constant and in this instance let it be assumed that $T' - T''$ is ten degrees F., while the system is in operation. Let it also be assumed for our present purpose that the brine body being cooled has reached maximum temperature of thirty degrees F., and that the compressor has been running for several minutes. If, as has been assumed, it requires ten degrees difference of temperature to force the heat through the available area at the required rate then the temperature of the refrigerating medium must be twenty degrees F. and with sulphur dioxide, the pressure in the evaporating system must be two and one-half pounds per square inch gauge pressure.

As the machine continues to operate and heat is absorbed from the brine the temperature of the brine body falls and as the temperature falls to the minimum of twenty-five degrees F., the temperature of the boiling liquid in the evaporating system must be fifteen degrees F., and the evaporator is now under one-half pound gauge pressure per square inch. Under this reduced pressure the switch 51 is opened stopping operation of the motor and compressor. As the brine reaches twenty-five degrees temperature and the temperature of the liquid in the evaporator 12 is fifteen degrees F., heat will continue to flow, because of this difference in temperature, from the source of heat (which is the coils 19) into the liquid refrigerant which will be evaporated into a gas. Inasmuch as the compressor is stopped at the time of this addition of heat to the liquid refrigerant, this evaporation will cause an increase of pressure in the expansion line 18 and when this pressure reaches about 4.6 pounds per square inch gauge pressure, evaporation will cease because the temperature of evaporation of sulphur dioxide at 4.6 pounds gauge pressure is twenty-five degrees F., which is the temperature of the source of heat and therefore heat ceases to flow through the conductor.

Under the conditions above set forth, when the brine has reached a temperature of thirty degrees F., the liquid refrigerant has also reached the same degree of temperature. This being so, the pressure in the evaporating coils is now about seven pounds per square inch gauge pressure which will close the switch and start the motor. The starting and stopping of the apparatus is thus controlled by a variation in pressure of the evaporating or low pressure side of the system as stated heretofore and the advantage of thus controlling the starting and stopping is that, while the brine is maintained within a five degree range of temperature, there is available a difference of pressure of six and one-half pounds per square inch for actuating the control switch. With a thermostatically controlled switch the starting and stopping of the mechanism would be through a range of 2.4 pounds pressure per square inch because the pressure corresponding to a temperature of thirty degrees F., is seven pounds and pressure corresponding to twenty-five degrees F., is 4.6 pounds per square inch gauge pressure. By introducing this starting and stopping device in the suction or low pressure line a relative large difference of pressure is made available with a relative small variation in the range of temperature.

From the foregoing it becomes evident that the system is entirely automatic in operation; is compact in form and highly efficient in operation. During the periods of operation of the apparatus the liquid refrigerant is automatically transferred from the high to low pressure side practically as fast as it accumulates and a practically constant maximum quantity of refrigerant is maintained in the evaporating chamber which is the condition under which the most efficient result is attained.

Having thus described my invention, what I claim and desire to secure by Letters Patent of the United States is—

In an artificial refrigerating apparatus, a base having a cooling chamber, a compressor mounted over the chamber, a circulating system for refrigerant having a high pressure side including a series of coils in the said cooling chamber, a double compartment chamber also mounted on the base, one compartment being open to the high pressure side of the system and the other compartment being open to the low pressure side of the system, a float controlled valve for controlling the discharge of the liquefied refrigerant from the high pressure to the low pressure chamber into the top of the low pressure chamber, a brine circulating system including a series of coils located in the said low pressure chamber, a pump for circulating the brine in the system therefor, said pump being connected with the compressor shaft.

In testimony whereof, I sign this specification.

JAMES H. DENNEDY.